United States Patent [19]

Sterrett

[11] 4,039,870
[45] Aug. 2, 1977

[54] INTEGRATED ANNULAR SUPPORTING STRUCTURE AND DAMPER SHIELD FOR SUPERCONDUCTING ROTOR ASSEMBLY OF DYNAMOELECTRIC MACHINE

[75] Inventor: Charles C. Sterrett, Pittsburgh, Pa.

[73] Assignee: Westinghouse Electric Corporation, Pittsburgh, Pa.

[21] Appl. No.: 596,793

[22] Filed: July 17, 1975

[51] Int. Cl.² .............................................. H02K 9/19
[52] U.S. Cl. ...................................... 310/52; 310/42; 228/107
[58] Field of Search ............................... 228/107–109; 310/261, 262, 52, 10, 42; 29/598

[56] References Cited

U.S. PATENT DOCUMENTS

| | | | |
|---|---|---|---|
| 3,314,139 | 4/1967 | Whittaker et al. | 228/107 |
| 3,742,265 | 6/1973 | Smith, Jr. | 310/52 |
| 3,904,901 | 9/1975 | Renard et al. | 310/52 |
| 3,942,053 | 3/1976 | Abolins et al. | 310/52 |

FOREIGN PATENT DOCUMENTS 263,724   6/1970   U.S.S.R. ............................ 29/598

Primary Examiner—Al Lawrence Smith
Assistant Examiner—K. J. Ramsey
Attorney, Agent, or Firm—G. H. Telfer

[57] ABSTRACT

A composite tubular structure for shielding and supporting the superconducting field assembly of the rotor of a dynamoelectric machine. A plurality of elongated hollow metal cylinders are disposed one within another and are metallurgically bonded together by the high energy impact produced by the detonation of an explosive charge. The metallurgical weld produced thereby is formed substantially uniformly across the metal-to-metal interface of next adjacent cylinders. In a preferred embodiment of this invention, the composite tubular structure comprises an outer cylinder formed of a non-ferromagnetic metal having high mechanical strength and ductility, and an inner cylinder formed of a non-ferromagnetic metal having an electrical conductivity which is high as compared with the electrical conductivity of the outer cylinder. When bonded by explosive fabrication, the two cylinders perform mechanically as a single structure, the inner cylindrical portion providing electromagnetic shielding and the outer cylindrical portion providing structural support.

9 Claims, 2 Drawing Figures

INTEGRATED ANNULAR SUPPORTING STRUCTURE AND DAMPER SHIELD FOR SUPERCONDUCTING ROTOR ASSEMBLY OF DYNAMOELECTRIC MACHINE

BACKGROUND OF THE INVENTION

1. Field of the Invention

This invention relates primarily to superconducting dynamoelectric machinery, and more specifically, this invention relates to structure for supporting and shielding a rotating superconducting field winding.

2. Description of the Prior Art

It is known that when certain materials, referred to as superconductors, are cooled to near absolute zero, they exhibit a complete loss of electrical resistance. Practical utilization of the zero resistance character of superconductive materials at cryogenic temparatures has recently been applied to dynamoelectric machinery. The development of the intrinsicly stable multi-filamentary superconductor has made it possible to build stable superconducting windings with relatively high transport current densities in large direct current fields.

The use of the superconductive direct current field winding considerably increases the field magnetomotive force generated by the windings and provides greatly increased flux densities in the active air gap of the machine. This increase in flux density obtains considerably increased power density and consequential reductions in the weight and volume of the machine. Thus higher ratings for turbine generators can be obtained without prohibitive increases in frame size.

The rotor structure of conventional superconducting generators is tubular as contrasted to the solid rotor structure of normally conducting generators. The tubular construction provides a reduction in weight as well as providing structural support, shielding, vacuum containment, and torque coupling. One tubular configuration which has been successfully utilized in a 5 MVA superconducting generator was constructed of a pair of inner and outer cylinders, one concentrically disposed within the other. In this construction the outer cylinder served as a supporting member and the inner cylinder served as a damper shield to protect the superconducting winding from the alternating stator fields existing externally of the rotor and to provide electrical damping for stability similar to that resulting from the rotor damper winding of a conventional generator. In this arrangement the cylinders were secured only at their end portions which permitted slight radial and axial displacement of one cylinder with respect to the other during rotation. As the rotor assemblies for superconducting machines are increased in diameter and length and operated at substantially higher rotational speeds, the effect of misalignment between the two cylinders becomes more significant and it becomes more difficult to maintain a stable moment of inertia about the principal axis of the rotor. Thus it would be desirable to provide an integrated rotor structure wherein the outer supporting cylinder and inner damping shield would perform mechanically as a single structure and thereby reduce the effective number of cylinders constituting the complete rotor assembly.

SUMMARY OF THE INVENTION

The present invention provides a composite integrated structure for enclosing, supporting, and shielding a superconducting field assembly of the rotor of a dynamoelectric machine. The composite structure comprises a plurality of elongated hollow metal cylinders coaxially disposed one within another and metallurgically bonded one to another by a coordinated high energy impact of one cylinder against another, such as may be produced by detonation of an explosive charge in an explosive welding fabrication process. The metallurgical bond produced by explosive fabrication is formed substantially uniformly across the metal-to-metal interface of next adjacent cylinders so that relative movement of one cylinder with respect to the other is thereby prevented.

In a preferred embodiment of the invention, the composite tubular structure comprises an outer cylinder formed of a non-ferromagnetic metal having high mechanical strength and ductility, and an inner cylinder formed of a non-ferromagnetic metal having an electrical conductivity which is high as compared with the electrical conductivity of the outer cylinder. The outer cylindrical portion of the composite tubular structure serves primarily as a structural supporting member while the inner cylindrical portion serves primarily as a shielding member. However, the composite structure provides for the transmission of torque from a prime mover to the field winding, vacuum containment, and heat transfer. The damper shield portion of the composite structure has sufficient electrical conductivity and radial thickness so that induced current may flow at reasonable loss levels, and thus attenuate the alternating stator fields to a level which will not interfere with the superconductive operation of the field assembly.

Control of interface creep is provided by the selection of compatible materials for the inner and outer cylinders. The metal selected for each cylinder is coordinated to provide a damper shield having an elasticity which is greater than that of the outer supporting cylinder so that the damper shield will tend to expand more than the outer cylinder during rotation. Under this arrangement, the forces of rotation will assist in maintaining the bond and will not tend to apply tension or shear stresses at the interface. Thus, the integrated cylinders perform statically and dynamically as one structure having the qualities and features of both.

The foregoing and other objects, advantages, and features of this invention will hereinafter appear, and for purposes of illustration, but not of limitation, an exemplary embodiment of the subject invention is shown in the appended drawings.

DESCRIPTION OF THE PREFERRED EMBODIMENT

Figure 1:
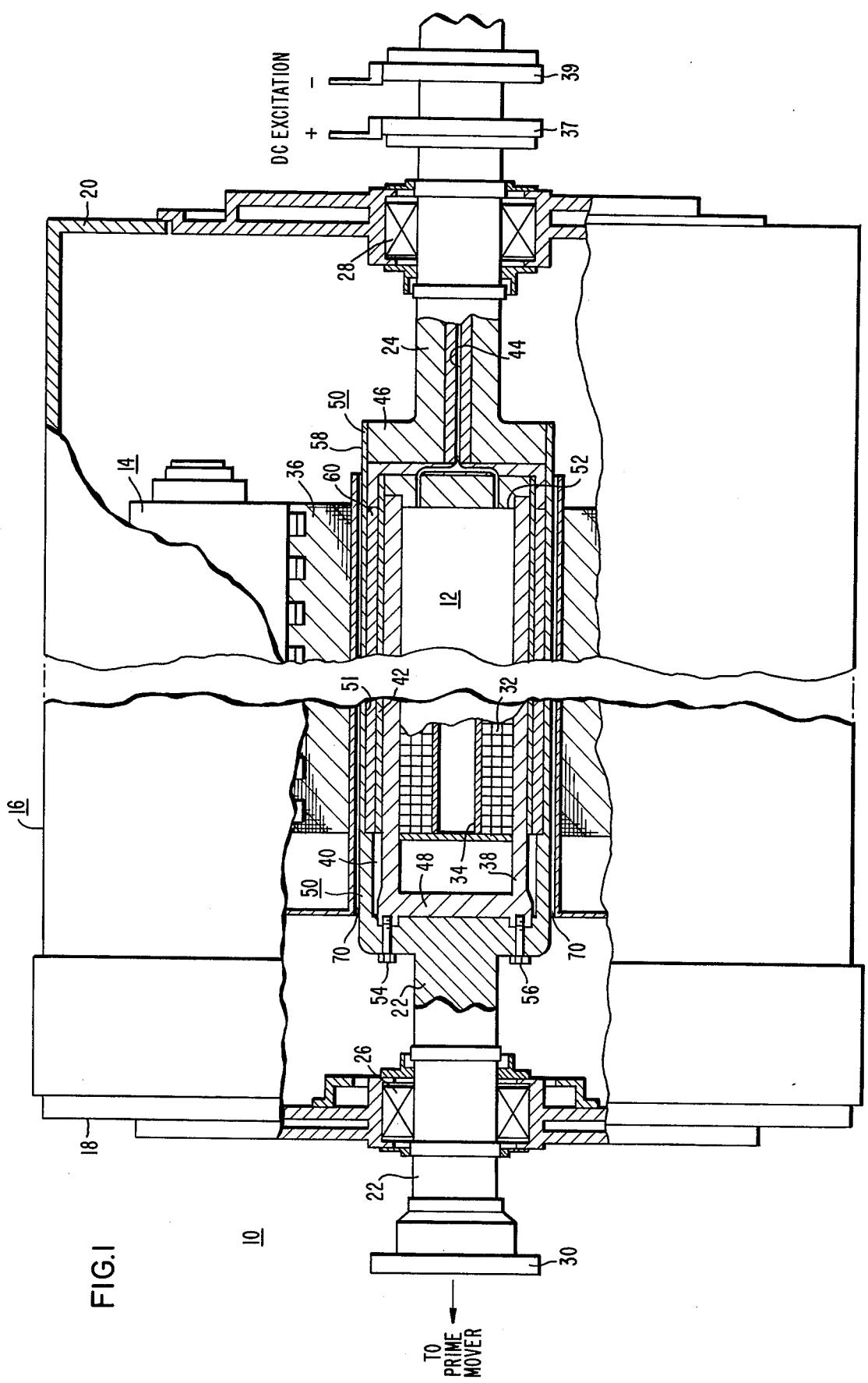
FIG. 1 is an elevational view of a superconducting dynamoelectric machine, partly in section, in which the invention is incorporated.

Referring now to the drawing, FIG. 1 illustrates a synchronous generator 10 having a superconductive rotor field winding assembly which is constructed and supported according to the teachings of the present invention in a manner to be hereinafter described.

The generator 10 comprises a rotor field assembly 12 and a stator assembly 14 which are enclosed in a housing 16. The housing 16 is generally cylindrical in shape and is closed by end plates 18 and 20. A drive shaft 22 and a supporting shaft 24 are mounted in the housing by bearings 26 and 28, respectively. The bearings 26 and 28 are conventional and are positioned at each end of the housing 16 to support the shafts 22 and 24 for rotational movement by a prime mover (not shown). A drive coupling 30 is used to connect the drive shaft 22 to the prime mover.

The rotor field assembly 12 comprises a superconductive DC field winding 32 which is wound about a non-ferromagnetic core 34. The core 34 is made of a material which has high mechanical strength and good ductility at cryogenic temperatures, such as austenitic stainless steel, although other non-ferromagnetic materials may be used to good advantage. By "non-ferromagnetic material" it is meant a substance whose relative permeability is approximately 1. Also shown is the stator assembly 14 which supports a non-superconducting winding 36. The stator winding 36 is adapted for multiphase AC output. The rotor field winding 32 is adapted for connection to a DC source (not shown), for example by collector rings 37 and 39, for excitation of the generator in the usual manner.

The field winding 32 is comprised of composite conductors made of a superconductive material such as a niobium titanium (Nb—Ti) alloy. Each composite conductor consists of a plurality of fine filaments, each filament being approximately 40 microns or less in diameter. The filaments are embedded in a copper sheath and are twisted about a composite axis. However, other types of superconductors may be used to good advantage.

A dewar vessel 38 encloses the field assembly 12 and takes the shape of a cylindrical annulus with a vacuum chamber 40 separating the dewar vessel from ambient conditions. In the vacuum chamber 40 there is located a radiation shield 42 which aids in preventing thermal conduction from the exterior of the dewar vessel 38 to the interior thereof. The interior of the dewar vessel 38 is maintained at a temperature near to absolute zero by an appropriate cryogenic fluid, such as nitrogen or helium. Due to the lower boiling temperature of helium (approximately 4° Kelvin), it is generally preferred for use as the cryogenic fluid, although other cyrogenic fluids may have equal or better utility in certain situations. The cryogenic fluid is introduced into the interior of the dewar vessel 38 through a conduit 44 which extends through an end plate 46. The conduit 44 is appropriately insulated to minimize heat transfer.

The supporting structure for the superconducting field assembly 12 comprises generally the drive shaft 22 which is secured to a composite cylindrical supporting assembly 50 and may be integrally formed therewith. The cylindrical supporting assembly 50 is a generally circumferentially extending annulus which in combination with the drive shaft portion defines the chamber 40 having a closed end 48 to which the drive shaft 22 is secured and an open end 52 for receiving the field assembly 12 and dewar vessel 38. The dewar and field winding assembly are secured to the closed end 48 of the cylindrical supporting assembly 50 in a cantilever mounting arrangement by means of bolts 54 and 56.

The cylindrical supporting assembly is appropriately sealed to provide a vacuum environment for the superconducting field assembly 20. Because of the large inertial mass of the rotor structure, the drive shaft 22 and cylindrical supporting assembly 50 are shown integrally joined and formed from a single steel forging of a high strength non-magnetic metal such as Inconel X-750 steel. However, they may be fabricated separately and joined together by other means, such as welding. The continuously forged unitary supporting structure provides maximum strength at the drive shaft end where bending and torsional stresses are highest under steady state and transient conditions.

Opposite the drive shaft end on the excitation end of the cylindrical supporting assembly 50, the end plate 46 is provided to close the chamber 40. The supporting shaft 24 is preferably integrally formed with the end plate 46 in the same manner that drive shaft 22 is formed with the cylindrical supporting assembly 50. However, the end plate 46 is secured to the cylindrical supporting assembly 50 by means of shrinking and keying. The shrink fit and key joint are sufficient since the excitation end of the rotor assembly is subjected to lower stresses as compared with the drive shaft end because of the lower inertial mass of the excitation end of the rotor assembly.

As a further protective measure an eddy current damper shield 60 made of electrically conductive material is disposed in a annular recess 51 within the cylindrical supporting assembly 50. The damper shield 60 is preferably constructed of a highly conductive, non-ferromagnetic metal such as Beryllium Copper CDA-172, Phosphor Bronze CDA-510, or other copper alloys having similar properties for density, electrical conductivity, permeability, thermal expansion, elasticity, and yield strength. The eddy current damper shield aids in preventing extraneous electrical and magnetic fields from penetrating into the superconducting field winding. The eddy current damper shield may be premachined, internally for example, to provide ventilating passageways.

Figure 2:
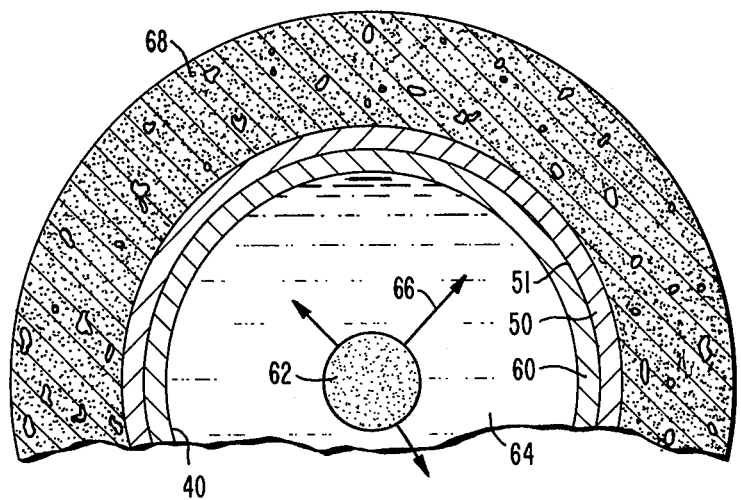
FIG. 2 is a sectional view which illustrates an arrangement for explosive bonding of a portion of the rotor of the dynamoelectric machine of FIG. 1.

According to the teachings of the present invention, the cylindrical damper shield 60 and the cylindrical supporting assembly 50 are bonded together substantially uniformly across substantially their entire interface by means of an explosive welding fabrication process which produces a metallurgically welded union of the two cylinders. The metallurgical bond is established by a coordinated high energy impact of the two cylinders one against the other which may be produced by the detonation of a high energy explosive charge 62 in close proximity to the cylinders as illustrated in FIG. 2 of the drawing. A medium 64, such as water, may be used to magnify and transmit the force 66 of the explosion uniformly. A die 68, composed of a relatively unyieldable material such as reinforced concrete, is circumferentially disposed about the outermost cylinder 50 and serves to limit the radial expansion of the cylinders 50 and 60.

The technique of explosion welding is well known and is not claimed by the present invention. By its application, however, a greatly improved supporting member and damper shield arrangement for the superconducting rotor assembly 12 is provided. The explosion welded, integrated annular supporting member and damper shield arrangement described herein satisfies the structural, shielding, torque transmittal, vacuum containment, and ventilation requirements in a unitary structure but avoids the alignment and supporting problems which have characterized conventional supporting arrangements.

Care must be exercised in the selection of metals to form the outer cylindrical supporting assembly 60 and the inner cylindrical damping shield 42. Combinations of metal such as aluminum-to-steel and titanium-tosteel, which form brittle intermetallics when exposed to the elevated temperatures of conventional welding methods, are readily joined by the explosion welding process. The only metals that cannot be welded by the process are those too brittle to withstand the impact of the explosive impulse. Generally, those metals with 5% or greater tensile elongation in a 2 inch gauge length and having a Charpy V-notch impact resistance of 10 foot pounds, or greater, are acceptable. As a further consideration, the outer cylindrical supporting assembly 50 should be formed of a non-ferromagnetic metal having high mechanical strength and good ductility. A metal such as AISI 304 or 310 austenitic steel or Inconel X-750 stainless steel may be used to good advantage for its construction.

The cylindrical damper shield 60 must have reasonable electrical conductivity and thickness so that induced currents may flow with reasonable loss levels, and thus attenuate the currents induced by extraneous electrical and magnetic fields to a level which does not interfere with the superconductive operation of the field winding 32. The damper shield 60 must attenuate any fundamental magneto-motive forces and fluxes that have a time varying relationship with respect to the rotor as well as high harmonic magneto-motive forces and fluxes. Therefore a damper shield having an electrical conductivity of at least 10% of the conductivity of copper should be used to reduce the risk of an accidental quench.

As a further consideration in the selection of compatible materials for forming the inner damper shield 60 and outer supporting cylinder 50, the modulus of elasticity in tension for the metal selected for the innermost cylindrical damper shield 60 should be substantially greater than that of the corresponding modulus of elasticity of the metal selected for the outermost cylindrical supporting assembly 50. Under this arrangement the cylindrical damper shield 60 will tend to expand more than the outermost cylindrical assembly 50, and rotational forces will therefore assist in maintaining the metallurgical bond at the metal-to-metal interface of the cylinders. For example, a typical value of the modulus of elasticity in tension for the damper shield material mentioned previously is on the order of $19 \times 10^6$ psi, and for the outermost cylindrical structural member $29 \times 10^6$, so that the damper shield will tend to expand more than the structural member by a ratio of approximately 3:2.

Additionally, both metals should have adequate yield strengths so that they will not deform under the stresses prevailing at the large diameters and high speeds encountered in high speed turbine driven superconducting generator applications. The composite cylindrical supporting structure of the present invention provides increased bond strength and toughness which exceeds that of single cylinders joined together by conventional means only at their end portions under all loading conditions even after repeated thermal cycling from normal to cryogenic temperatures. The yield strength may be further improved by cold working the composite cylindrical structure after it has been exploded into its final configuration.

Another advantage of the explosive welded composite cylindrical supporting structure is that the integrated damper shield and supporting member provides excellent heat conduction so that cooling of both structures may be accomplished more efficiently at the outer rotor surface 58 of the composite assembly by the cooling medium in the air gap 70 which is typically low pressure hydrogen. Since the composite structure described by the present invention is metallurgically bonded across the entire interface of the two cylinders, it inherently provides better heat transfer than the prior art structure which is metallurgically joined only at each end portion.

It may be advantageous in certain situations to utilize a plurality of electrically conductive tubes of various radial thickness, each having different electrical, mechanical, and thermal characteristics in order to fabricate a thinner composite cylindrical structure having equal or better corresponding properties as compared with a composite structure comprising only two cylindrical portions. In this case, the explosive fabrication process may be performed sequentially for each additional cylinder. Again, each cylindrical member may be pre-machined to provide ventilating passageways.

It will be apparent that an improved supporting and shielding structure has been provided for a superconductive winding assembly of a dynamoelectric machine. Although the composite structure is formed of two or more members each having different mechanical, electrical, and thermal properties, they are bonded together metallurgically by an explosive fabrication process so that they perform statically and dynamically as one structure with equal or better shielding ability and improved mechanical strength and heat transfer properties.

While a particular embodiment of the invention has been shown and described for the purpose of illustration, other arrangements and embodiments may be practiced by those skilled in the art without departing from the scope and spirit of the invention. It is not desired, therefore, that the invention be limited to the specific arrangement described herein.

I claim as my invention:

1. In a dynamoelectric machine having a rotor member disposed on a shaft for rotation within an annular stator member, said rotor member having a field assembly including a superconductive winding disposed thereon, the combination with said rotor member of a composite tubular structure for supporting said field assembly for rotation within said stator member, said composite structure comprising a pair of elongated hollow metal cylinders disposed one within another, there being an innermost cylinder and an outermost cylinder, the innermost one of said cylinders defining a chamber within which said field assembly is disposed, and at least one of said cylinders being secured to said shaft for concurrent rotation therewith, said cylinders being bonded together substantially uniformly across substantially their entire interface, said bond being produced by a coordinated high energy impact of said cylinders one against another, said impact being of sufficient magnitude to produce a metallurgically welded union therebetween, said outermost cylinder being formed of a non-ferromagnetic metal having sufficient mechanical strength to provide stable support for said field assembly during rotation and said innermost cylinder being formed of a non-ferromagnetic metal having sufficient electrical conductivity and radial thickness to attenuate extraneous electrical and magnetic fields to a level which does not interfere with the superconductive operation of said field winding.

2. The combination as defined in claim 1, the modulus of elasticity in tension for the metal of said innermost cylinder being substantially greater than the corresponding modulus of elasticity of the metal of said outermost cylinder, said innermost cylinder tending to expand more than said outermost cylinder, whereby rotational forces assist in maintaining said metallurgical bond at the metal-to-metal interface of said cylinders.

3. The combination defined in claim 1, each said cylinder being formed of a metal capable of sustaining at least 5% tensile elongation in a 2 inch gauge length and having a Charpy V-notch impact resistance of at least 10 foot pounds.

4. The combination defined in claim 1, the electrical conductivity of said innermost cylinder being at least 10% of the conductivity of copper.

5. The combination defined in claim 1, said high energy impact being produced by the detonation of an explosive charge within the chamber defined by said innermost cylinder, the force of said impact being directed substantially radially outwardly from the central axis of said cylinders, the radial expansion of said cylinders being limited by a die circumferentially disposed about said outer most cylinder, said die being relatively unyieldable as compared with said cylinders.

6. The combination as defined in claim 1, including at least one additional cylinder concentrically disposed intermediate of said innermost and said outermost cylinders, said cylinders being bonded together by the successive performance of said high energy impact bonding process.

7. The combination as defined in claim 1, said shaft and said outermost cylinder being continuously forged into a unitary structure for transmitting torque from a prime mover to said field assembly, the integral combination of said shaft and said outermost cylinder defining a chamber having a closed end portion with which said shaft is integrally formed and an opened end for receiving said field assembly and said innermost cylinder.

8. The combination as defined in claim 7, said field assembly being secured to said closed end portion in a cantilever mounting arrangement therewith, and said innermost cylinder being disposed within an annular recess of said outermost cylinder.

9. The combination as defined in claim 8, including means concentrically disposed intermediate of said field assembly and said innermost cylinder for thermally insulating said superconducting winding from said cylinders.

* * * * *